(12) United States Patent
Hoffman et al.

(10) Patent No.: US 6,826,399 B1
(45) Date of Patent: *Nov. 30, 2004

(54) APPARATUS AND METHOD OF UPDATING A MOBILITY DATABASE

(75) Inventors: Briana A Hoffman, Streamwood, IL (US); John May, Dundee, IL (US); Philip Fleege, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 785 days.

This patent is subject to a terminal disclaimer.

(21) Appl. No.: 09/607,791

(22) Filed: Jun. 30, 2000

(51) Int. Cl.$^7$ ................................................ H04Q 7/20
(52) U.S. Cl. ...................... 455/433; 455/560; 707/204
(58) Field of Search ............................ 455/432.1, 433, 455/435.1, 456.1, 457, 560, 414; 370/328; 707/202, 204

(56) References Cited

U.S. PATENT DOCUMENTS

| | | | |
|---|---|---|---|
| 5,243,597 A | | 9/1993 | Buckingham et al. |
| 5,490,203 A | * | 2/1996 | Jain et al. ................. 455/435.1 |
| 5,726,764 A | | 3/1998 | Averbuch et al. |
| 5,819,178 A | | 10/1998 | Cropper |
| 6,138,016 A | * | 10/2000 | Kulkarni et al. ............ 455/433 |
| 6,148,199 A | * | 11/2000 | Hoffman et al. ............ 455/433 |

* cited by examiner

Primary Examiner—Nay Maung
Assistant Examiner—Nick Corsaro
(74) Attorney, Agent, or Firm—Steven R. Santema; Valerie M. Davis

(57) ABSTRACT

An apparatus for and method of updating (305) each of the tiers of a multiple-tier database (200) by defining an independent data rate between each of the tiers of the database (200). The present method provides maximum data throughput, which is not provided with a solution that selects the lowest possible data rate for all transmissions between all tiers. By providing for a different communication rate (303) that is independent of the communication rate between each set of tiers of the database (200), throughput is maximized while limiting the possibility of surpassing or overwhelming component capabilities that could cause equipment malfunction or "crashing." The communication rate may be negotiated (401 through 413) between components at the different tiers of the database (200).

31 Claims, 3 Drawing Sheets

APPARATUS AND METHOD OF UPDATING A MOBILITY DATABASE

FIELD OF THE INVENTION

This invention relates to multiple-tier databases, including but not limited to updating of multiple-tier mobility databases in radio frequency (RF) communication systems.

BACKGROUND OF THE INVENTION

Many types of systems use multiple tier databases to more efficiently be able to use stored data without overburdening a single repository of the data. Information in such a database may be entered or updated at any tier of the database and then communicated between the various tiers to ensure that the latest data is provided to all tiers requiring such data.

The basic operation and structure of a land mobile communication unit system is well known. Land mobile communication unit systems typically comprise one or more communication units (e.g., vehicle-mounted or portable communication units in a land mobile system and communication unit/telephones in a cellular system) and one or more repeaters that transceive information via the RF communication resources. These communication resources may be narrow band frequency modulated channels, time division multiplex slots, frequency pairs, and so forth. Land mobile communication unit systems may be organized as trunked communication systems, where a plurality of communication resources is allocated amongst a group of users by assigning the repeaters on a communication-by-communication basis within an RF coverage area.

In a typical communications network, a subscriber, or user, database is maintained that includes user information, user profiles, feature activation status, access privileges, and so forth. This database is typically referred to as a home location register (HLR), and is well understood. Upon receiving a request for registration from a communication unit, the network equipment accesses the HLR, finds the correlating subscriber record, and determines what features to activate for the communication unit, as well as the necessary authentication information, among other pertinent information. This information is transferred to another database called the visitors location register (VLR), which is also well understood in the art. The VLR is used by the system to also track the communication unit's location in the system, i.e., what particular cell or cells the communication unit was most recently in, so that an incoming call may be routed.

The HLR and VLR may be constructed as a multiple-tier database, which may be referred to as a mobility database. Typically, when the VLR is updated with information, the VLR immediately passes the updated information to the HLR. In certain circumstances, it may be necessary to update large amounts of data between the various tiers of such a database. In these situations, immediately passing the data between the various tiers may send data at such a rate that one or more tiers of the database are unable to keep up with the amount of data being transferred, thereby resulting in data not being entered, data buffers being over run, and even one or more components of the database crashing, thereby compounding the problem.

Accordingly, there is a need for a method of updating a multiple tier database that avoids over-running any of the components of the database.

DESCRIPTION OF A PREFERRED EMBODIMENT

Figure 1:
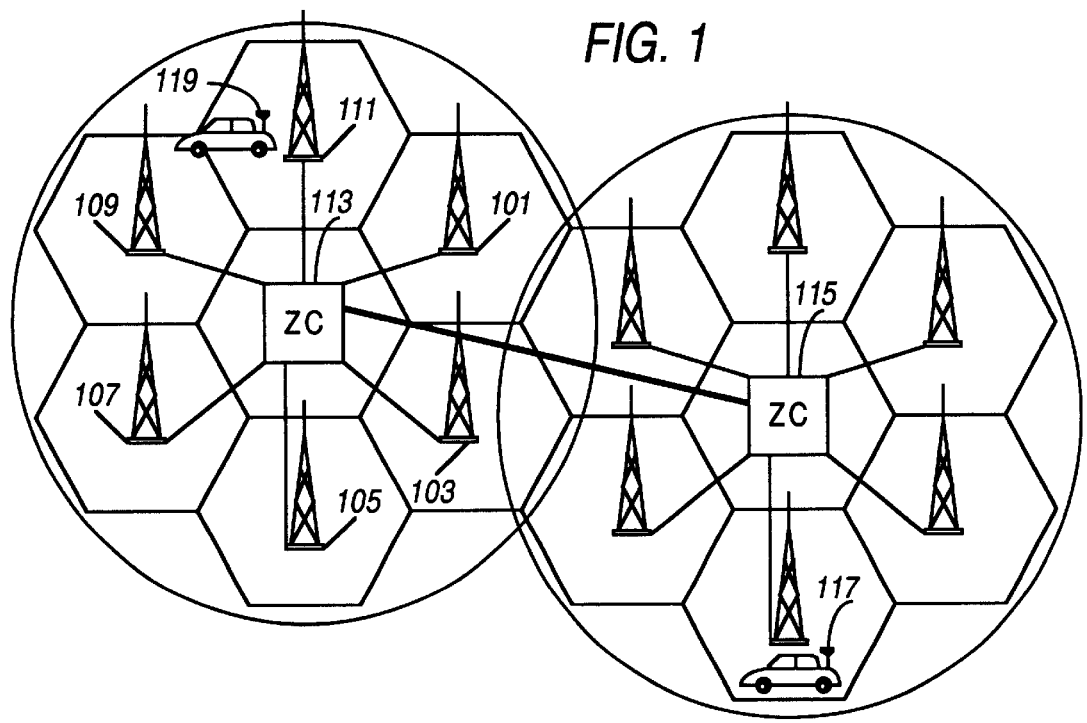
FIG. 1 is a block diagram of a communication system in accordance with the invention.

The following describes an apparatus for and method of updating each of the tiers of a multiple-tier database by defining an independent data rate between each of the tiers of the database. The present method provides maximum data throughput, which is not provided by prior solutions that select the worst case scenario data rate for all transmissions between all tiers, in which case all possible components at all tiers are updating simultaneously. By providing for a different communication rate that is independent of the communication rate between each set of tiers of the database, throughput is maximized while limiting the possibility of surpassing or overwhelming component capabilities that could cause equipment malfunction or "crashing." The communication rate may be negotiated between components at the different tiers of the database.

A method of updating a mobility database, comprises the steps of detecting a need to update information in the mobility database, wherein the mobility database comprises a plurality of database components among at least three different tiers, including a first tier, a second tier, and a third tier, and wherein the first tier communicates with the second tier and the second tier communicates with the third tier. A first rate of communication between the first tier and the second tier is established. A second rate of communication between the second tier and the third tier is established. The first rate and the second rate are independent of one another. The information in the mobility database is updated by communicating using the first rate and the second rate.

The mobility database may store location information for a plurality of communication units in a wide-area communication system. A site location register may reside at the first tier, a visitors location register may reside at the second tier, and a home location register may reside at the third tier. The step of detecting a need to update information in the mobility database may comprise: detecting the return of a previously failed communication path between two different tiers of the mobility database; detecting the return of a previously failed location register that resides at one of the at least three tiers; detecting initialization of at least one of the plurality of database components; or detecting a need to completely rebuild at least one of the plurality of database components. A third rate of communication may be established between the second tier and the first tier, wherein the third rate is independent of any other rate. The mobility database may comprise a fourth tier, wherein the method further comprises the step of establishing a fourth rate of communication between the third tier and the fourth tier, and wherein the fourth rate is independent of any other rate. A plurality of rates may be used to communicate among the at least three tiers, and each of the plurality of rates may be independent of the other rates. Establishing a rate of communication may comprise selecting a fixed rate based on an expected amount of data transfer or negotiating the rate between the database components at different tiers.

Another method of the present invention comprises the steps of detecting a need to update information in the mobility database, wherein the mobility database comprises a plurality of database components among at least two different tiers, and negotiating a rate of communication between a first component at a first tier and a second component at a second tier of the at least two tiers. The information in the mobility database is updated by communicating using the negotiated rate of communication.

When negotiating the rate between the database components at different tiers, the method comprises the steps of a first component selecting a first nominated rate, a second component selecting a second nominated rate, and selecting, by one of the first component and the second component, the lower rate from among the first nominated rate and the second nominated rate as the rate of communication between the first component and the second component. At least one of the first nominated rate and the second nominated rate may be based on how many of the plurality of components of the mobility database are updating the component selecting the nominated rate. At least one of the first nominated rate and the second nominated rate may be based on a maximum aggregate rate for updating of the component selecting the nominated rate. Any step of selecting a nominated rate may comprise the steps of determining how many of the plurality of components of the mobility database are updating the component selecting the nominated rate, yielding an activity factor; determining a maximum aggregate rate for updating of the component selecting the nominated rate; and combining the activity factor and the maximum aggregate rate to yield the nominated rate.

The present invention includes a database comprising a first plurality of database components located at a first tier of the database; a second plurality of database components located at a second tier of the database; a first plurality of communication resources between the first plurality of database components and the second plurality of database components, wherein communications take place at a first rate of communication on the first plurality of communication resources; a third plurality of database components located at a third tier of the database; and a second plurality of communication resources between the second plurality of database components and the third plurality of database components, wherein communications take place at a second rate of communication on the second plurality of communication resources, wherein the first rate of communication is independent of the second rate of communication.

In a wide-area communication system, such as shown in FIG. 1, communications take place among communication units 117 and 119 distributed among a plurality of sites 101, 103, 105, 107, 109, and 111 under the control of a zone controller 113. A second zone controller 115 in control of a different plurality of sites may also communicate with the first zone controller 113, thereby forming a multiple zone system. Each site typically is comprised of a number of base stations or repeaters (not shown), the resources of which are assigned or granted for communications including unit-to-unit calls, talkgroup calls, and telephone interconnect calls. Communication units 117 and 119, which may be mobile or portable communication units, communicate within the system through the use of communication unit identifications (IDs) and access privileges stored at a database, known as a mobility database, within the communication system.

Figure 2:
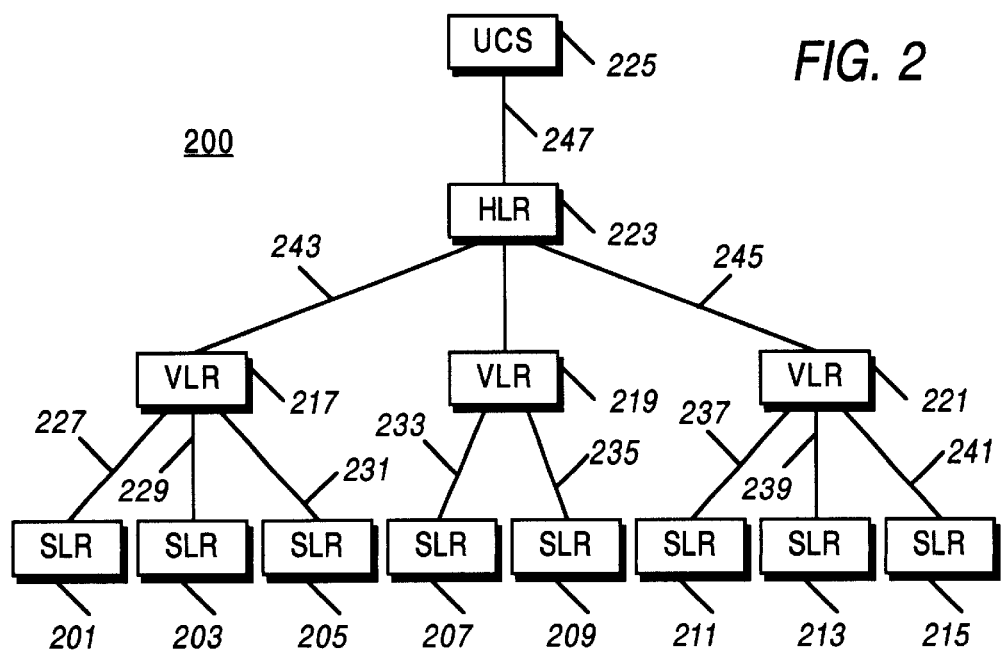
FIG. 2 is a block diagram of a multiple-tier database in accordance with the invention.

A block diagram showing a multiple-tier database is shown in FIG. 2. In the preferred embodiment, the multiple-tier database, which is a mobility database, is comprised of four tiers. Although four tiers are used, the invention may be successfully practiced with three tiers or five or more tiers. In the preferred embodiment, the database is set up in an hierarchical manner. At the lowest level of the database at the first tier, or Tier 1, mobility information is stored at a plurality of site location registers (SLRs) 201, 203, 205, 207, 209, 211, 213, and 215. The mobility information may be stored at a site location register that comprises a storage device or other memory with a console, base station, site controller, external database location, and so forth. This mobility information may include the communication unit IDs and any relevant access privileges or user attributes such as talkgroup IDs for those communication units which are presently registered, or located, at the site. In other words, each SLR 201, 203, 205, 207, 209, 211, 213, and 215 maintains its own database for those communication units located or registered at the SLR 201, 203, 205, 207, 209, 211, 213, and 215.

A number of VLRs 217, 219, and 221 are located in the second tier, Tier 2, of the mobility database. Each VLR has a limited amount of the total information in the database, which information is related to the users affiliated at the sites that are serviced by the VLR. Each VLR services one or more sites of the communication system. This user information is provided for talkgroups and individuals affiliated at the sites. Each VLR receives information from the sites, including updates in communication units affiliated at the site, and the VLR may update the SLRs by notifying it when a subscriber has left the SLR's coverage area.

An HLR 223 resides in the third tier, Tier 3, of the mobility database. In the preferred embodiment, the HLR is a distributed master database containing communication attributes for users, such as user IDs (for individuals or talkgroups), manager configurable data, access privileges, and user profiles, as well as location information in terms of which VLR(s) currently service the communication units. Also in the preferred embodiment, one distributed HLR contains records for users that are individuals and another distributed HLR contains records for talkgroups. Multiple VLRs may service a single talkgroup. The VLRs 217, 219, and 221 transfer updated location information to the HLR on an as needed basis, so that the HLR has updated location information for each communication unit. The HLR 223 may also be updated by a user configuration server (UCS) 225 that is used to enter new or updated information into the HLR 223, such as new or different access privileges or user attributes, new user profiles, and so forth. In the preferred embodiment, the UCS resides at a fourth tier, Tier 4.

In the preferred embodiment, the database components include the storage devices residing at the SLRs 201, 203, 205, 207, 209, 211, 213, and 215, the VLRs 217, 219, and 221, the HLR 223, and the UCS 225. Multiple data paths 227, 229, 231, 233, 235, 237, 239, 241, 243, 245, and 247 are used to convey data between the various database components 201 through 225. Also in the preferred embodiment, the VLRs 217, 219, and 221 and the HLR 223 reside at the zone controller 113 or 115, and the UCS 225 resides in a separate database element from the zone controller 113 or 115. Although only three VLRs and one HLR are shown in the drawings, the present invention may be successfully applied to any number of VLRs or HLRs.

Figure 3:
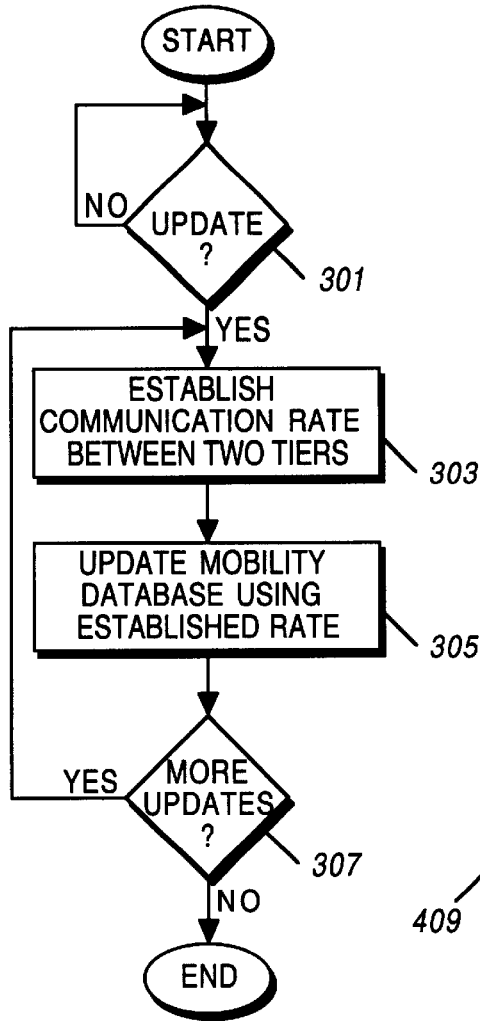
FIG. 3 is a flowchart showing a method of updating a multiple-tier database in accordance with the invention.

A flowchart showing a method of updating a multiple-tier database, such as a mobility database, as shown in FIG. 3. At step 301, it is determined if the database needs to be updated. Various reasons for updating the database include: routine updating of change of location information for a communication unit; the return of a previously failed communication path between different tiers of the data base, e.g., when a tier-to-tier data path returns to active status after having failed; when a location register, or other storage component, from among the tiers of the database is either initialized or returns to service after having failed; when any of the database components is initialized; when the database needs to be rebuilt, such as after a massive database failure; after a system failure requiring a large number of affiliations, and so forth. Step 301 is typically performed by the component of the database that will be updating another component of the database, i.e., the sourcing component. When such an update is necessary at step 301, the process continues at step 303, where a communication rate is established between components at two different tiers of the mobility database, e.g., between Tier 1 and Tier 2, between Tier 2 and Tier 3, between Tier 3 and Tier 4, and so forth. A communication rate may be established by using a predetermined fixed rate, that may be independently determined for each of the different communication paths, or, as performed in the preferred embodiment, by negotiating a communication rate, such as by using the method of the flowchart of FIG. 4. At step 305, the mobility database is updated using the rate established at step 303 for the tiers for which the rate was established. If at step 307 more updates need to be sent, the process continues with step 303, otherwise the process ends. The method of FIG. 3 is performed between different pairs of components at different tiers throughout the database structure. In this way, the multiple-tier database is updated using independent rates of communication between the different tiers.

Figure 4:
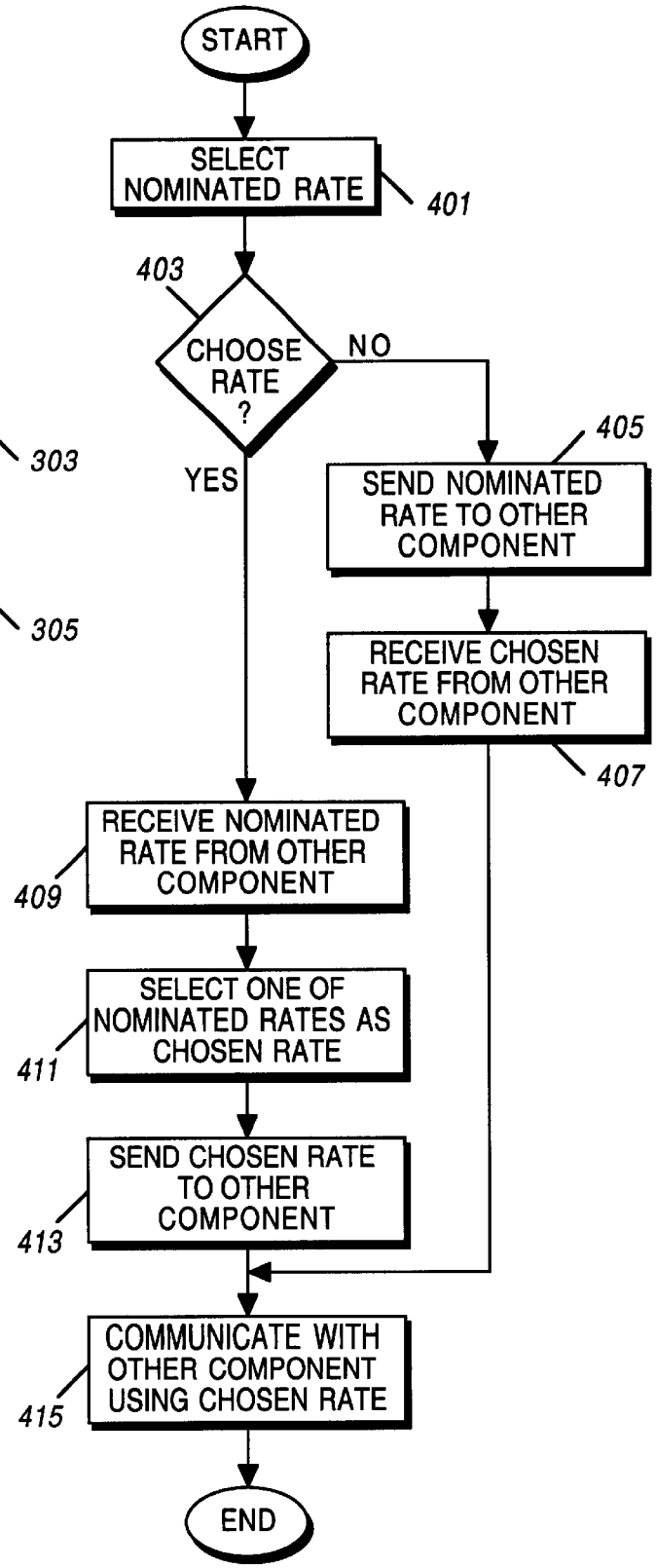
FIG. 4 is a flowchart showing a method of negotiating a rate of communication for use in a multiple-tier database in accordance with the invention.

A flowchart showing a method of negotiating a communication rate is shown in FIG. 4. This flowchart describes the process used by two different components from two different tiers of the mobility database to select a rate of communication between the database components. At step 401, a nominated rate is chosen with which to communicate between components to update the database. The nominated rate is the rate that the component performing the flowchart of FIG. 4 can utilize without causing a disruption, e.g., the maximum rate at which data can be received, sent, and/or processed. A nominated rate may be chosen, for example, by using the flowchart of FIG. 5. Alternatively, a nominated rate may be a fixed rate, chosen from a table that scales the data rate by the number of components sending update information, or chosen from a table providing another type of rate selection.

At step 403, if the component performing the steps of the flowchart is not the component that will chose the rate of communication, then the process continues with step 405. At step 405, the component sends its nominated rate to the other component with which the present component is negotiating, which other component will select the chosen communication rate. At step 407, this component receives the chosen rate from the other component and the process continues with step 415. If the component performing the steps of the flowchart is the component that will chose the communication rate at step 403, the process continues with step 409, where the component receives a nominated rate from the other component. At step 411, one of the nominated rates is selected as the chosen rate for communication between the components. In the preferred embodiment, the selection of the nominated rate is performed by choosing the lowest rate of the two nominated rates, so as to prevent over-running of the buffer or otherwise overwhelming the capabilities of the database components performing an update. At step 413, the chosen rate is sent to the other component. At step 415, the two components update each other by communicating with each other using the chosen rate, and the process ends.

Figure 5:
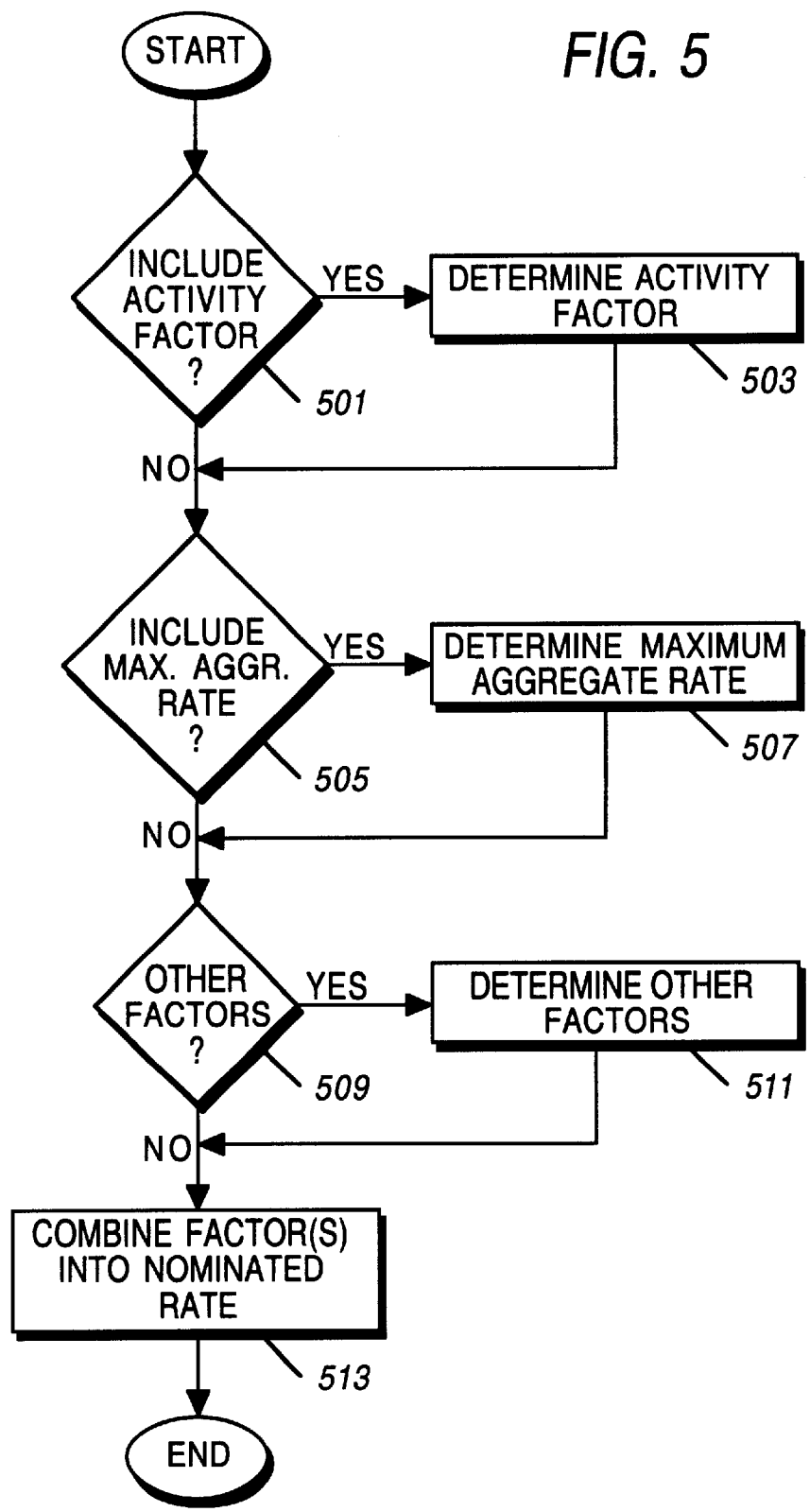
FIG. 5 is a flowchart showing a method of selecting a nominated rate of communication for use in a multiple-tier database in accordance with the invention.

A flowchart showing a method of selecting a nominated rate of communication for use in a multiple-tier database is shown in FIG. 5. At step 501, it is determined if the nominated rate will be based on an activity factor. If the nominated rate is to be based on an activity factor, the process continues with step 503, where it is determined how many of the components of the mobility database are updating the component that is selecting the nominated rate. This number of components will be determined to be the activity factor at step 503, and the process continues with step 505. If at step 505 it is determined that the nominated rate is to be based upon a maximum aggregate rate, the process continues with step 507, where the maximum aggregate rate is determined. The maximum aggregate rate is the sum total of the update information that can be processed per unit time regardless of how many sources are providing the update information. At step 509, it is determined if any other factors are to be used in determining the nominated rate. If another factor is to be used, the process continues with step 511, where the other factors are determined. Such factors may include the total amount of information to be updated throughout the database, whether or not a large failure has occurred within or around the database, whether or not this is a routine update, which components of the database are being updated, likelihood of component failures, normal update rates, CPU (central processing unit) loading or idle time, task priorities, and so forth. The process then continues with step 513, where any of the factors determined above to be included in the nominated rate are then combined to determine the nominated rate for the particular component. In the preferred embodiment, the nominated rate is calculated by dividing the maximum aggregate rate by the activity factor (i.e., the number of components with which the present component is currently communicating in an update).

Because the communication rate between components is determined between the individual components, each data path 227, 229, 231, 233, 235, 237, 239, 241, 243, 245, and 247 between devices in the mobility database 200 may use a different communication rate, i.e., there may be a different independent data rate for each data path in the mobility database 200. In addition, multiple different data rates may be used on each data path 227, 229, 231, 233, 235, 237, 239, 241, 243, 245, and 247 for performing different tasks.

Thus, the present invention provides a method of allowing different rates of communication between different levels of a multiple-tier database, rather then the prior method of utilizing the same rate of communication between different tiers for all tiers no matter what system activity is taking place. Thus, information throughout the database is able to be throttled at the appropriate rate to provide maximum throughput, while efficiently updating and not causing component failure. Updating subsequent to any system or database failure will take place more quickly and efficiently without risk of further component failure. In addition, it is easier to expand the mobility database structure by adding another tier or another component in an existing tier, and further such addition does not require any knowledge of the existing mobility database structure to be able to integrate into it.

Although the present invention describes the use of and determination of independent communication rates between different tiers of a mobility database, the same principles may be applied to other types of multiple-tiered databases within the spirit of the present invention.

What is claimed is:

1. A method of updating a mobility database, comprising the steps of:
   detecting a need to update information in the mobility database, wherein the mobility database comprises a plurality of database components among at least three different tiers, including a first tier, a second tier, and a third tier, and wherein the first tier communicates with the second tier and the second tier communicates with the third tier;
   establishing a first rate of communication between the first tier and the second tier;
   establishing a second rate of communication between the second tier and the third tier;
   wherein the first rate and the second rate are independent of one another;
   updating the information in the mobility database by communicating using the first rate and the second rate.

2. The method of claim 1, wherein the mobility database stores location information for a plurality of communication units in a wide-area communication system.

3. The method of claim 1, wherein the step of detecting a need to update information in the mobility database comprises detecting the return of a previously failed communication path between two different tiers of the mobility database.

4. The method of claim 1, wherein a site location register resides at the first tier, a visitors location register resides at the second tier, and a home location register resides at the third tier.

5. The method of claim 1, wherein the step of detecting a need to update information in the mobility database comprises detecting the return of a previously failed component that resides at one of the at least three tiers.

6. The method of claim 1, wherein the step of detecting a need to update information in the mobility database comprises detecting initialization of at least one of the plurality of database components.

7. The method of claim 1, wherein the step of detecting a need to update information in the mobility database comprises detecting a need to completely rebuild at least one of the plurality of database components.

8. The method of claim 1, further comprising the step of establishing a third rate of communication between the second tier and the first tier, and wherein the third rate is independent of any other rate.

9. The method of claim 1, wherein the mobility database comprises a fourth tier, further comprising the step of establishing a fourth rate of communication between the third tier and the fourth tier, and wherein the fourth rate is independent of any other rate.

10. The method of claim 1, wherein a plurality of rates are used to communicate among the at least three tiers, and each of the plurality of rates is independent of the other rates.

11. The method of claim 1, wherein any step of establishing a rate of communication comprises selecting a fixed rate based on an expected amount of data transfer.

12. The method of claim 1, wherein any step of establishing a rate of communication comprises the step of negotiating the rate between the database components at different tiers.

13. The method of claim 12, wherein the step of negotiating comprises the steps of:
    a first component selecting a first nominated rate;
    a second component selecting a second nominated rate;
    selecting, by one of the first component and the second component, the lower rate from among the first nominated rate and the second nominated rate as the rate of communication between the first component and the second component.

14. The method of claim 13, wherein at least one of the first nominated rate and the second nominated rate are based on how many of the plurality of components of the mobility database are updating the component selecting the nominated rate.

15. The method of claim 13, wherein at least one of the first nominated rate and the second nominated rate are based on a maximum aggregate rate for updating of the component selecting the nominated rate.

16. The method of claim 13, wherein any step of selecting a nominated rate comprises the steps of:
    determining how many of the plurality of components of the mobility database are updating the component selecting the nominated rate, yielding an activity factor;
    determining a maximum aggregate rate for updating of the component selecting the nominated rate;
    combining the activity factor and the maximum aggregate rate to yield the nominated rate.

17. The method of claim 1, wherein any step of establishing a rate of communication comprises determining a total of the update information that can be processed per unit time.

18. The method of claim 1, wherein any step of establishing a rate of communication comprises determining a total of the update information that can be processed per unit time regardless of how many sources are providing the update information.

19. The method of claim 1, wherein any step of establishing a rate of communication comprises determining a likelihood of component failure.

20. A method of updating a mobility database, comprising the steps of:

detecting a need to update information in the mobility database, wherein the mobility database comprises a plurality of database components among at least two different tiers;

negotiating a rate of communication between a first component at a first tier and a second component at a second tier of the at least two tiers;

updating the information in the mobility database by communicating using the negotiated rate of communication.

21. The method of claim 20, wherein the step of negotiating comprises the steps of:

the first component selecting a first nominated rate;

the second component selecting a second nominated rate;

selecting, by one of the first component and the second component, the lower rate from among the first nominated rate and the second nominated rate as the rate of communication between the first component and the second component.

22. The method of claim 21, wherein at least one of the first nominated rate and the second nominated rate are based on how many of the plurality of components of the mobility database are updating the component selecting the nominated rate.

23. The method of claim 21, wherein at least one of the first nominated rate and the second nominated rate are based on a maximum aggregate rate for updating of the component selecting the nominated rate.

24. The method of claim 21, wherein any step of selecting a nominated rate comprises the steps of:

determining how many of the plurality of components of the mobility database are updating the component selecting the nominated rate, yielding an activity factor;

determining a maximum aggregate rate for updating of the component selecting the nominated rate;

combining the activity factor and the maximum aggregate rate to yield the nominated rate.

25. The method of claim 20, wherein the step of negotiating comprises determining a total of the update information that can be processed per unit time.

26. The method of claim 20, wherein the step of negotiating comprises determining a total of the update information that can be processed per unit time regardless of how many sources are providing the update information.

27. The method of claim 20, wherein the step of negotiating comprises determining a likelihood of component failure.

28. A database comprising:

a first plurality of database components located at a first tier of the database;

a second plurality of database components located at a second tier of the database;

a first plurality of communication resources between the first plurality of database components and the second plurality of database components, wherein communications take place at a first rate of communication on the first plurality of communication resources;

a third plurality of database components located at a third tier of the database;

a second plurality of communication resources between the second plurality of database components and the third plurality of database components, wherein communications take place at a second rate of communication on the second plurality of communications resources;

wherein the first rate of communication is independent of the second rate of communication.

29. The database of claim 28, wherein any rate of communication is based on a total of the update information that can be processed per unit time.

30. The database of claim 22, wherein any rate of communication is based on a total of the update information that can be processed per unit time regardless of how many sources are providing the update information.

31. The database of claim 29, wherein any rate of communication is based on a likelihood of component failure.

\* \* \* \* \*

UNITED STATES PATENT AND TRADEMARK OFFICE
CERTIFICATE OF CORRECTION

PATENT NO. : 6,826,399 B1
DATED : November 30, 2004
INVENTOR(S) : Hoffman et al.

It is certified that error appears in the above-identified patent and that said Letters Patent is hereby corrected as shown below:

Column 10,
Line 43, replace "claim 22" with -- claim 28 --
Line 47, replace "claim 29" with -- claim 28 --

Signed and Sealed this

Twenty-sixth Day of July, 2005

JON W. DUDAS
*Director of the United States Patent and Trademark Office*